US012586813B2

(12) United States Patent
Ono et al.

(10) Patent No.: US 12,586,813 B2
(45) Date of Patent: Mar. 24, 2026

(54) MANUFACTURING APPARATUS AND MANUFACTURING METHOD OF POWER STORAGE DEVICE

(71) Applicants: TOYOTA JIDOSHA KABUSHIKI KAISHA, Toyota (JP); Shimizu industry CO., LTD., Kariya (JP)

(72) Inventors: Masato Ono, Nagoya (JP); Kazuhito Kato, Nagoya (JP); Katsuaki Odagi, Toyohashi (JP); Kazumasa Inata, Nagoya (JP); Yousuke Koide, Nagoya (JP); Tomohiro Kitade, Kariya (JP); Atsushi Suganuma, Chiryu (JP)

(73) Assignees: TOYOTA JIDOSHA KABUSHIKI KAISHA, Toyota (JP); SHIMIZU INDUSTRY CO., LTD, Kariya (JP)

( * ) Notice: Subject to any disclaimer, the term of this patent is extended or adjusted under 35 U.S.C. 154(b) by 1056 days.

(21) Appl. No.: 17/653,542

(22) Filed: Mar. 4, 2022

(65) Prior Publication Data

US 2022/0367905 A1      Nov. 17, 2022

(30) Foreign Application Priority Data

Mar. 8, 2021      (JP) ................................. 2021-036504

(51) Int. Cl.
*H01M 10/0562*      (2010.01)
*H01M 10/04*      (2006.01)
(Continued)

(52) U.S. Cl.
CPC ... *H01M 10/0562* (2013.01); *H01M 10/0404* (2013.01); *H01M 10/0585* (2013.01);
(Continued)

(58) Field of Classification Search
CPC ........... H01M 10/0585; H01M 10/128; H01M 10/14; H01M 10/16; H01M 10/281;
(Continued)

(56) References Cited

U.S. PATENT DOCUMENTS

| | | | | |
|---|---|---|---|---|
| 2009/0186270 | A1* | 7/2009 | Harada ............... | H01M 50/178 |
| | | | | 429/185 |
| 2015/0270585 | A1* | 9/2015 | Sasaoka ............ | H01M 10/0413 |
| | | | | 429/157 |

(Continued)

FOREIGN PATENT DOCUMENTS

| | | | |
|---|---|---|---|
| JP | 2004193006 A | | 7/2004 |
| JP | 2015050004 A | * | 3/2015 |

(Continued)

*Primary Examiner* — Helen Oi K Conley
*Assistant Examiner* — Amanda Rosenbaum
(74) *Attorney, Agent, or Firm* — Dickinson Wright, PLLC

(57) ABSTRACT

A manufacturing apparatus of a power storage device includes a resin filling mold configured to form an internal space that houses a laminated electrode body and to supply photo-curing resin used for forming a resin layer on at least a side surface on a long side of the laminated electrode body. The mold includes an upper mold, a lower mold, and two side surface molds on the long sides. Further, the manufacturing apparatus includes a light radiation device that radiates light which photo-cures the photo-curing resin supplied to the internal space. The manufacturing apparatus is configured to, when a front part of the supplied photo-curing resin that flows along the side surface reaches a predetermined position of the side surface, cure the flowing front parts by radiating the light from the light radiation device and stop the flowing front part from flowing along the side surface.

20 Claims, 9 Drawing Sheets

(51) Int. Cl.
  *H01M 10/0525*    (2010.01)
  *H01M 10/0585*    (2010.01)
  *H01M 50/124*    (2021.01)
  *H01M 50/547*    (2021.01)

(52) U.S. Cl.
  CPC ....... *H01M 50/124* (2021.01); *H01M 50/547* (2021.01); *H01M 10/0525* (2013.01); *H01M 2300/0065* (2013.01)

(58) Field of Classification Search
  CPC ......... H01M 10/287; H01M 10/28838; H01M 10/3987; H01M 10/0468; H01M 10/0404; H01M 10/0413; H01M 50/103; H01M 50/166; H01M 50/207; H01M 50/209
  See application file for complete search history.

(56)             References Cited

U.S. PATENT DOCUMENTS

| | | | |
|---|---|---|---|
| 2017/0352923 | A1 | 12/2017 | Iwano et al. |
| 2019/0348717 | A1 | 11/2019 | Kato et al. |
| 2019/0393557 | A1* | 12/2019 | Itoh .................. H01M 10/0562 |

FOREIGN PATENT DOCUMENTS

| | | | |
|---|---|---|---|
| JP | 2017220447 | A | 12/2017 |
| JP | 2019197652 | A * | 11/2019 |
| JP | 2019200863 | A | 11/2019 |

* cited by examiner

MANUFACTURING APPARATUS AND MANUFACTURING METHOD OF POWER STORAGE DEVICE

CROSS-REFERENCE TO RELATED APPLICATION

This application claims priority to Japanese Patent Application No. 2021-036504 filed on Mar. 8, 2021, incorporated herein by reference in its entirety.

BACKGROUND

1. Technical Field

The present disclosure relates to a technology for manufacturing a power storage device and, more specifically, to a manufacturing apparatus and a manufacturing method of a power storage device including a resin layer made of a cured material of a photo-curing resin on a side surface of a laminated electrode body in which a plurality of rectangular positive electrodes and negative electrodes is laminated with separators therebetween.

2. Description of Related Art

Power storage devices, such as secondary batteries including lithium-ion secondary batteries, sodium-ion secondary batteries, and nickel-hydrogen batteries, or physical batteries including lithium-ion capacitors and other electric double-layer capacitors, are preferably used not only as so-called portable power sources, such as personal computers or mobile terminals, but also, recently, as power sources for vehicle drive. In particular, lithium-ion secondary batteries which obtain high energy density with lightweight are preferable as high-output power sources for vehicle drive, such as electric vehicles (EV), plug-in hybrid vehicles (PHV), and hybrid vehicles (HV), such that demand is expected to increase.

One example of a form of this type of power storage device includes a laminated electrode body in which a plurality of positive electrodes and negative electrodes is laminated with separators therebetween. One example of a typical power storage device including the laminated electrode body as described above is a secondary battery having a form of a so-called all-solid-state battery in which a powdery solid electrolyte is used instead of a liquid electrolyte (an electrolyte solution). Since a liquid electrolyte (especially a non-aqueous electrolyte solution) is not used in an all-solid-state battery, it is possible to easily construct a laminated electrode body having a laminated structure made of positive and negative electrodes and solid electrolyte layers without executing complicated processing when handling an organic solvent, such as a non-aqueous electrolyte solution. Further, since no electrolyte solution is used, it is possible to simplify the structure of the electrode body and thus contribute to improving battery capacity per unit volume of a battery. For this reason, it is expected to be used as a high-output power source for vehicle drive that requires a higher capacity. One example of a typical shape of an all-solid-state battery includes a battery including a laminated electrode body in which a plurality of rectangular positive electrodes and negative electrodes is laminated with solid electrolyte layers (separators) therebetween.

An all-solid-state battery including such a laminated electrode body is known in which a resin layer made of a cured material of resin is formed on at least one of side surfaces on each of long sides and short sides around upper and lower surfaces when two rectangular wide surfaces positioned at both ends in the positive and negative electrode laminating direction of the laminated electrode body are used as the upper surface and the lower surface, respectively. By forming the resin layer made of the cured resin material on the side surface of the laminated electrode body, it is possible to improve the rigidity of this type of all-solid-state battery. Further, since edges (periphery portions) of the positive and negative electrodes and the solid electrolyte layers are respectively exposed on the side surface of the laminated electrode body, by providing the resin layer on the side surface, it is possible to cause the resin layer on the side surface to function as a barrier layer that prevents moisture or a foreign matter from entering the inside of the laminated electrode body from the edges. Japanese Unexamined Patent Application Publication No. 2004-193006, Japanese Unexamined Patent Application Publication No. 2017-220447, Japanese Unexamined Patent Application Publication No. 2019-197652, and Japanese Unexamined Patent Application Publication No. 2019-200863 describe examples of hexahedral all-solid-state batteries in which resin layers are formed on side surfaces of laminated electrode bodies.

SUMMARY

One example of a method of forming a resin layer on a side surface of a laminated electrode body includes a method of using a mold (hereinafter referred to as a "resin filling mold") that can house the laminated electrode body therein and supplies (fills) a fluidable resin material for resin layer formation between the side surface of the laminated electrode body housed inside the mold and an inner wall of the mold. By using such a mold, a predetermined amount of resin material is supplied to the side surface of the laminated electrode body arranged inside the mold and the supplied resin material is cured inside the mold (a typical curing method includes photo-curing as one example), thereby stably manufacturing a relatively large number of laminated electrode bodies (power storage devices) in which a target resin layer is formed on the side surface thereof.

However, when forming the resin layer on the side surface of the laminated electrode body using the resin filling mold, it may be difficult to accurately distinguish a part in which the resin layer is formed from a part in which the resin layer is not formed on the side surface. For example, when forming a resin layer on a side surface on a long side of a hexahedral laminated electrode body having rectangular wide surfaces (that is, both end surfaces in the positive and negative electrode laminating direction) and connecting a tab-shaped current collecting terminal of any one of a positive electrode and a negative electrode to the short side, it is preferable not to form the resin layer on the current collecting terminal on a side surface on the short side. To ensure this, it is important to control a flow of the resin material supplied to the inside of the mold. In other words, when the resin material before curing is supplied to the inside of the mold, the resin material flows along the side surface on the long side of the laminated electrode body, and it may be difficult to accurately stop the flow at a predetermined position. When the flow of the resin material is inaccurately controlled inside the mold, it is not easy to prevent the resin material from overflowing a part other than the part in which the resin layer is formed.

The present disclosure provides a manufacturing apparatus and a manufacturing method that can accurately distinguish a part in which the resin layer is formed from a part in which the resin layer is not formed on the side surface of the laminated electrode body and can manufacture a power storage device where a resin layer is stably formed at an accurate position on side surfaces of a laminated electrode body when forming the resin layer on the side surfaces of the laminated electrode body using such a resin filling mold.

A manufacturing apparatus of a power storage device according to a first aspect of the present disclosure relates to an apparatus that manufactures a power storage device. The power storage device includes a laminated electrode body in which a plurality of rectangular positive electrodes and negative electrodes is laminated with separators between the positive and negative electrodes and a resin layer made of a cured material of a photo-curing resin formed on each of at least two side surfaces on long sides from among side surfaces of the laminated electrode body when two rectangular wide surfaces at both ends in a laminating direction of the laminated electrode body are defined as an upper surface and a lower surface, respectively. The manufacturing apparatus of the power storage device disclosed herein includes a resin filling mold including an upper mold and a lower mold respectively facing the upper surface and the lower surface and a first side surface mold and a second side surface mold respectively facing the two side surfaces on the long sides, and a light radiation device configured to radiate light which photo-cures the photo-curing resin supplied to an internal space of the resin filling mold. The resin filling mold is configured to form the internal space that houses the laminated electrode body and to supply the photo-curing resin used for forming the resin layer on at least the side surfaces on the long sides of the electrode body housed in the resin filling mold. Further, the manufacturing apparatus disclosed herein is configured to, when front parts of the photo-curing resin supplied to the internal space that flow along the side surfaces of the electrode body reach predetermined positions of the side surfaces, cure the flowing front parts by radiating the light from the light radiation device and stop the flowing front parts from flowing along the side surfaces.

With the manufacturing apparatus having such a configuration, when the photo-curing resin before photo-curing is supplied to the inside of the resin filling mold, flows along the side surfaces of the laminated electrode body arranged inside the mold, and reaches the predetermined positions of the side surfaces, the front parts can be photo-cured by radiating the light from the light radiation device to the flowing front parts of the photo-curing resin. As such, it is possible to stably stop the flowing front parts from flowing along the side surfaces at the predetermined positions. Therefore, with the manufacturing apparatus having this configuration, it is possible to accurately distinguish the part in which the resin layer is formed from the part in which the resin layer is not formed on the side surfaces of the laminated electrode body, and to manufacture the power storage device where the resin layer is stably formed at accurate positions on the side surfaces of the laminated electrode body.

In the first aspect, the light radiation device may be configured to radiate the light to respective vicinities of both ends in a long side direction of the two side surfaces on the long sides of the electrode body housed in the resin filling mold. With such a configuration, it is possible to accurately cure the flowing front parts of the photo-curing resin at a total of four respective predetermined positions set in the vicinity of the both ends in the long side direction of the two side surfaces. As a result, it is possible to efficiently and accurately form the resin layer at predetermined parts on the two side surfaces of the laminated electrode body.

Further, in the first aspect, at least portions, in the first side surface mold and the second side surface mold, in vicinities of the predetermined positions may be made of a material that can transmit the light which photo-cures the photo-curing resin. With such a configuration, it is possible to radiate the light from the light radiation device provided on the outside of the mold toward the inside of the mold. As such, it is possible to simply configure the light radiation device and the resin filling mold, and stably form the resin layer with a simple configuration.

Further, in the first aspect, the manufacturing apparatus of the power storage device may further include a light-shielding body configured to restrict the light radiated from the light radiation device from scattering in a direction deviating from the predetermined positions. The light-shielding body may be attached to the portions, in the first side surface mold and the second side surface mold, in the vicinities of the predetermined positions. With such a configuration, it is possible to prevent the light from being radiated to positions deviating from the predetermined positions, and prevent the photo-curing resin from being mistakenly cured precedingly at positions other than the predetermined positions (other than the flowing front parts) on the side surfaces of the laminated electrode body.

Further, in the first aspect, the resin filling mold may include a short side facing portion that faces a side surface on a short side of the electrode body. With such a configuration, it is possible to form the resin layer on the side surface on the short side of the electrode body.

Further, in the first aspect, the electrode body may include a positive electrode current collecting terminal and a negative electrode current collecting terminal respectively connected to the positive electrode and the negative electrode of the electrode body. The positive electrode current collecting terminal and the negative electrode current collecting terminal may be arranged to project outward from at least one side surface from among two side surfaces on the short sides of the electrode body. Here, the light radiation device may be configured to radiate the light to the front part of the photo-curing resin that flows along at least one side surface from among the two side surfaces on the short sides. With such a configuration, it is possible to stop the photo-curing resin from flowing on the short side of the electrode body. From the stopped part, the photo-curing resin is filled between the side surface mold and the electrode body. After the photo-curing resin is filled, when it is cured by radiating the light through a light-transmittable side surface mold described below, a solid resin layer is formed on the side surface of the electrode body.

Further, in the first aspect, the positive electrode current collecting terminal and the negative electrode current collecting terminal may be arranged to project outward from the respective two side surfaces on the short sides of the electrode body. Further, the light radiation device may be configured to radiate the light to the front parts of the photo-curing resin that flow along the respective two side surfaces on the short sides. With such a configuration, when the current collecting terminals project from both of the two side surfaces on the short sides of the electrode body, it is possible to form the resin layer.

Further, in the first aspect, in the short side facing portion, a portion in a vicinity of a position to which the light is radiated may be made of a material that can transmit the light which photo-cures the photo-curing resin. With such a configuration, it is possible to radiate the light from the light radiation device provided on the outside of the mold toward the inside of the mold. As such, it is possible to simply configure the light radiation device and the resin filling mold, and stably form the resin layer with the simple configuration.

Further, in the first aspect, the resin filling mold may have a resin material discharging unit that discharges the photo-curing resin supplied to the internal space of the resin filling mold to the outside. With such a configuration, it is possible to discharge an excess amount of the supplied photo-curing resin to the outside of the mold. Further, since it is not necessary to provide a sensor or the like used for stopping the flow of the photo-curing resin, it is possible to provide a power storage device manufacturing apparatus having a simple configuration.

Further, in the first aspect, the resin filling mold may be configured to adjust a distance between the upper mold and the lower mold according to a thickness in the laminating direction of the laminated electrode body. With such a configuration, even when the thickness in the laminating direction of the laminated electrode body to be used (that is, thicknesses of the laminated positive and negative electrodes or the separators themselves, or the number of laminated positive and negative electrodes) is different, by appropriately adjusting the distance between the upper mold and the lower mold, it is possible to use only one resin filling mold.

A second aspect of the present disclosure relates to a manufacturing method of a power storage device. The manufacturing method disclosed herein is a method of manufacturing the power storage device that includes a laminated electrode body in which a plurality of rectangular positive electrodes and negative electrodes is laminated with separators between the positive and negative electrodes and a resin layer made of a cured material of a photo-curing resin formed on each of at least two side surfaces on long sides from among side surfaces of the laminated electrode body when two rectangular wide surfaces at both ends in a laminating direction of the laminated electrode body are defined as an upper surface and a lower surface, respectively. The manufacturing method includes a step of preparing the laminated electrode body, a step of housing the electrode body in an internal space formed by a resin filling mold, a step of supplying, to the internal space of the resin filling mold, the photo-curing resin used for forming the resin layer on the at least two side surfaces on the long sides of the electrode body housed in the resin filling mold, and a step of curing, when front parts of the supplied photo-curing resin that flow along the side surfaces of the electrode body reach predetermined positions, the flowing front parts by radiating light to the flowing front parts and stopping the flowing front parts from flowing along the side surfaces. The resin filling mold includes an upper mold and a lower mold respectively facing the upper surface and the lower surface and a first side surface mold and a second side surface mold respectively facing the two side surfaces on the long sides. Further, the manufacturing method disclosed herein can be appropriately executed by any of power storage device manufacturing apparatuses disclosed herein. With the manufacturing apparatus having such a configuration, it is possible to accurately distinguish the part in which the resin layer is formed from the part in which the resin layer is not formed on the side surfaces of the laminated electrode body, and to manufacture the power storage device in which the resin layer is stably formed at accurate positions on the side surfaces of the laminated electrode body.

In the second aspect, when the light is radiated, the light may be radiated to respective vicinities of both ends in a long side direction of the two side surfaces on the long sides of the electrode body housed in the resin filling mold. By radiating the light in such a manner, it is possible to accurately cure the flowing front parts of the photo-curing resin at a total of four respective predetermined positions set in the vicinities of the both ends in the long side direction of the two side surfaces. As a result, it is possible to efficiently and accurately form the resin layer at predetermined parts on the two side surfaces of the laminated electrode body.

Further, in the second aspect, at least portions, in the first side surface mold and the second side surface mold, in vicinities of predetermined positions may be made of a material that can transmit the light which photo-cures the photo-curing resin. By employing the resin filling mold having such a configuration, it is possible to radiate the light from a light radiation device provided on the outside of the mold toward the inside of the mold. As such, it is possible to simply configure the light radiation device and the resin filling mold, and stably form the resin layer with a simple configuration.

Further, in the second aspect, a light-shielding body that restricts the radiated light from scattering in a direction deviating from the predetermined positions when at least the light is radiated may be attached to the portions, in the first side surface mold and the second side surface mold, in the vicinities of the predetermined positions. With the manufacturing method having such a configuration, it is possible to prevent the light from being radiated to positions deviating from the predetermined positions, and prevent the photo-curing resin from being mistakenly cured precedingly at positions other than the predetermined positions (other than the flowing front parts) on the side surfaces of the laminated electrode body.

Further, in the second aspect, the resin filling mold may include a short side facing portion that faces a side surface on a short side of the electrode body. With the manufacturing method having such a configuration, it is possible to form the resin layer on the side surface on the short side of the electrode body.

In the second aspect, the electrode body may include a positive electrode current collecting terminal and a negative electrode current collecting terminal respectively connected to the positive electrode and the negative electrode of the electrode body. The positive electrode current collecting terminal and the negative electrode current collecting terminal may be arranged to project outward from at least one side surface from among two side surfaces on short sides of the electrode body. Here, the light may be radiated to the front part of the photo-curing resin that flows along at least one side surface from among the two side surfaces on the short sides. With the manufacturing method having such a configuration, it is possible to stop the photo-curing resin from flowing on the short side of the electrode body. From the stopped part, the photo-curing resin is filled between the side surface mold and the electrode body. After the photo-curing resin is filled, when it is cured by radiating the light through a light-transmittable side surface mold described below, a solid resin layer is formed on the side surface of the electrode body.

Further, in the second aspect, the positive electrode current collecting terminal and the negative electrode current collecting terminal may be arranged to project outward from the respective two side surfaces on the short sides of the electrode body. Further, the light may be radiated to the front parts of the photo-curing resin that flow along the respective two side surfaces on the short sides. With the manufacturing method having such a configuration, when the current collecting terminals project from both of the two side surfaces on the short sides of the electrode body, it is possible to form the resin layer.

Further, in the second aspect, in the short side facing portion, a portion in a vicinity of a position to which the light is radiated may be made of a material that can transmit the light which photo-cures the photo-curing resin. With the manufacturing method having such a configuration, it is possible to radiate the light from the light radiation device provided on the outside of the mold toward the inside of the mold. As such, it is possible to simply configure the light radiation device and the resin filling mold, and stably form the resin layer with the simple configuration.

Further, in the second aspect, the resin filling mold may have a resin material discharging unit that discharges the photo-curing resin supplied to the internal space of the resin filling mold to the outside. With the manufacturing method having such a configuration, it is possible to discharge an excess amount of the supplied photo-curing resin to the outside of the mold. Further, since it is not necessary to provide a sensor or the like used for stopping the flow of the photo-curing resin, it is possible to provide a power storage device manufacturing apparatus having a simple configuration.

Further, in the second aspect, the resin filling mold may be configured to adjust a distance between the upper mold and the lower mold according to a thickness in the laminating direction of the laminated electrode body. With the manufacturing method having such a configuration, even when the thickness in the laminating direction of the laminated electrode body to be used (that is, thicknesses of the laminated positive and negative electrodes or the separators themselves, or the number of laminated positive and negative electrodes) is different, by appropriately adjusting the distance between the upper mold and the lower mold, it is possible to use only one resin filling mold.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
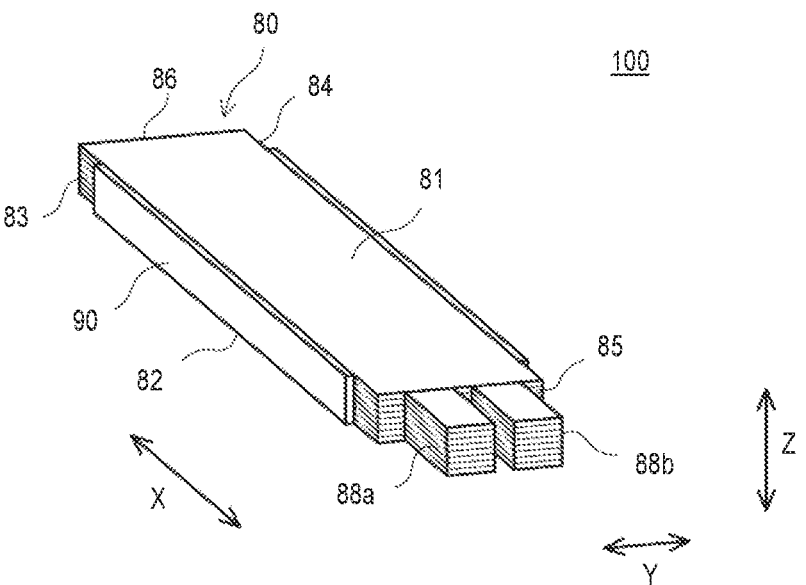
FIG. 1 is a perspective view schematically illustrating an example of an all-solid-state battery that includes a laminated electrode body according to a first embodiment.

In the present specification, a "power storage device" refers to a device that can be repeatedly charged, and is represented by a secondary battery, a capacitor (also referred to as a condenser), and the like. Typically, examples of the power storage device include a secondary battery, such as a lithium-ion secondary battery, a sodium-ion secondary battery, and a nickel-hydrogen battery, and a capacitor, such as a lithium-ion capacitor and an electric double-layer capacitor. In the present specification, the "lithium-ion secondary battery" includes a so-called non-aqueous electrolyte secondary battery in which electrolyte is an organic-solvent-based, an all-solid lithium-ion secondary battery in which electrolyte is composed of a solid material, and a lithium-ion polymer secondary battery in which electrolyte is composed of a quasi-solid polymer. In the present specification, an "active material" of positive and negative electrodes is an electrode material that can compose the positive and negative electrodes in a power storage device. For example, an active material in the secondary battery refers to a substance that can reversibly occlude and release a chemical species (such as lithium ions in the lithium-ion secondary battery) that serves as a charge carrier. For example, an active material in a capacitor refers to a substance that can adsorb and desorb electrolyte ions (cations and anions). Since a type and a shape of the active material do not characterize a manufacturing apparatus and a manufacturing method of a power storage device disclosed herein, detailed description thereof will be omitted.

Matters other than those specifically mentioned in the present specification and necessary for executing the present disclosure can be grasped as design matters by those skilled in the art based on the existing technologies in the art. The present disclosure can be executed based on the contents disclosed in the present specification and common general technical knowledge in the art. "A to B" in the present specification means a numerical range of A or more and B or less, and includes a range greater than A and smaller than B. Hereinafter, one embodiment disclosed herein will be described in detail, using an all-solid-state lithium-ion secondary battery (hereinafter, also referred to as an "all-solid-state battery") including a solid electrolyte, as an example of a power storage device to which the technology is applied. The dimensional relationships (length, width, thickness, and the like) in each drawing do not reflect the actual dimensional relationships. Further, members and parts that execute the same action are designated by the same reference signs, and duplicate descriptions thereof will be omitted or simplified. Further, in each drawing, an arrow X represents the long side direction of a wide surface of an electrode body, an arrow Y represents the short side direction of the wide surface of the electrode body, and an arrow Z represents the laminating direction of the electrode body.

First Embodiment

FIG. 1 illustrates an all-solid-state battery 100 according to the present embodiment. In FIG. 1, an exterior body is omitted, and only a laminated electrode body 80 housed inside the battery is illustrated. The exterior body is not particularly limited, but may be, for example, an exterior body made of a laminated film or a battery case having a rectangular parallelepiped shape (including a substantially rectangular parallelepiped shape).

The laminated electrode body 80 includes a rectangular positive electrode, a rectangular negative electrode, and a solid electrolyte layer that also functions as a separator that separates the positive electrode from the negative electrode, and is configured such that a plurality of rectangular positive electrodes and negative electrodes is laminated with separators therebetween. The laminated electrode body 80 has a hexahedral shape in which wide surfaces (that is, both end faces in the laminating direction Z of the positive and negative electrodes) have a rectangular shape. When the rectangular wide surfaces of the laminated electrode body 80 are used as an upper surface 81 and a lower surface 82, the laminated electrode body 80 has four side surfaces. Two of the four side surfaces are side surfaces 83, 84 on the long sides of the laminated electrode body 80, and the other two side surfaces are side surfaces 85, 86 on the short sides of the laminated electrode body 80. Hereinafter, the two side surfaces 83, 84 on the long side of the laminated electrode body 80 are also referred to as a first side surface 83 and a second side surface 84, respectively. In the description below, the "laminated electrode body" may be simply referred to as an "electrode body".

The electrode body 80 includes a resin layer 90 made of a cured material of a photo-curing resin. The resin layer 90 is formed on at least the first side surface 83 and the second side surface 84 of the electrode body 80, respectively. The resin layer 90 is formed in a region of the first side surface 83 and the second side surface 84 excluding both ends in the long side direction X of the wide surfaces of the electrode body 80. In the present embodiment, a side surface 85 on the short side of the electrode body 80 is provided with positive and negative electrode current collecting terminals 88a, 88b and the resin layer 90 is not formed thereon. However, when the side surface 85 is not provided with the positive and negative electrode current collecting terminals 88a, 88b, a resin layer may be formed on the side surface 85 on the short side.

Since the edges (periphery portions) of the positive and negative electrodes and the solid electrolyte layers are exposed on the side surfaces of the electrode body 80, the edges can be protected by providing the resin layer 90 on the electrode body 80. In the all-solid-state battery 100 including the electrode body 80, an expansion of an active material during charging/discharging (particularly an initial charging of a battery assembly) causes an occurrence of a displacement, a gap, or a crack in a solid electrolyte layers or adjacent positive/negative electrode active material layers that may influence a battery performance. However, it is possible to restrict the occurrence, thereby restricting deterioration of the battery performance caused by the gaps or cracks.

The electrode body 80 includes a positive electrode current collecting terminal 88a and a negative electrode current collecting terminal 88b. The positive and negative electrode current collecting terminals are tab-shaped and project outward from the side surface 85 on the short side of the electrode body 80. Each of the positive and negative electrode current collecting terminals may be arranged on one of the two side surfaces 85, 86.

The positive electrode is typically provided with a rectangular sheet-shaped positive electrode current collecting body and a positive electrode active material layer formed on a surface (on one side or both sides, here on both sides) on the current collecting body. The negative electrode is typically provided with a rectangular sheet-shaped negative electrode current collecting body and a negative electrode active material layer formed on a surface (on one side or both sides, here on both sides) on the current collecting body.

Materials composing the positive electrode, the negative electrode, and the solid electrolyte layer may be the same as those used in existing all-solid-state lithium-ion secondary batteries, but are not particularly limited. As the positive electrode current collecting body, a conductive member made of a metal having high conductivity may be used. A foil material made of a metal, for example, aluminum (Al) (such as an aluminum foil), can be used. The positive electrode active material layer contains a positive electrode active material (such as $LiNi_{1/3}Co_{1/3}Mn_{1/3}O$) and a solid electrolyte, and may contain various additives, such as a binder or a conductive auxiliary agent, as necessary. As the negative electrode current collecting body, a conductive member made of a metal having high conductivity may be used. For example, a foil material made of a metal, such as copper (Cu), can be used. The negative electrode active material layer contains a negative electrode active material (such as graphite (C)) and a solid electrolyte, and may contain various additives, such as a binder, a conductive auxiliary agent, and a thickener, as necessary. As the solid electrolyte, various oxide-based solid electrolytes (such as $Li_3PO_4$) or sulfide-based solid electrolyte (such as $Li_2S$—$P_2S_5$) may be used. As the conductive material, a carbon material, such as acetylene black (AB), can be appropriately used. As the binder, a fluorine-based binder, such as polyvinylidene fluoride (PVDF), or a rubber-based binder, such as styrene-butadiene rubber (SBR), can be appropriately used.

Figure 2:
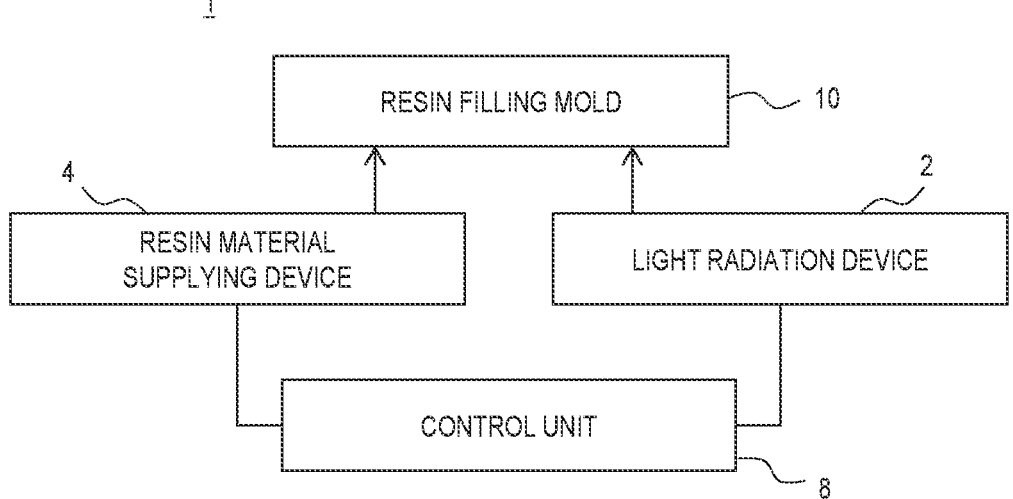
FIG. 2 is a block diagram illustrating a configuration of a manufacturing apparatus of a power storage device disclosed herein.

As illustrated in FIG. 2, a manufacturing apparatus 1 disclosed herein roughly includes a resin filling mold 10, a resin material supplying device 4, a light radiation device 2, and a control unit 8. The manufacturing apparatus 1 manufactures a power storage device by supplying a photo-curing resin material to the side surface on the long side of the electrode body and by curing the resin material to form a resin layer. The control unit 8 controls a series of operations of the manufacturing apparatus 1 (for example, turning on/off a switch of the resin material supplying device, determination of a supply amount and a supply speed of the resin material, turning on/off a switch of the light radiation device, determination of the intensity of radiated light, and a time period of light radiation). The control unit 8 includes a CPU that executes a processing program, a ROM that stores the processing program, a RAM that temporarily stores data, an input/output port, and a communication port. A basic configuration of the control unit 8 may be the same as that of an existing control unit of this type, but the configuration does not characterize the present disclosure, and thus detailed description thereof will be omitted. The control unit 8 is not an essential component of the manufacturing apparatus 1, and as described below, a series of operations can be manually executed by an operator.

Figure 3A:
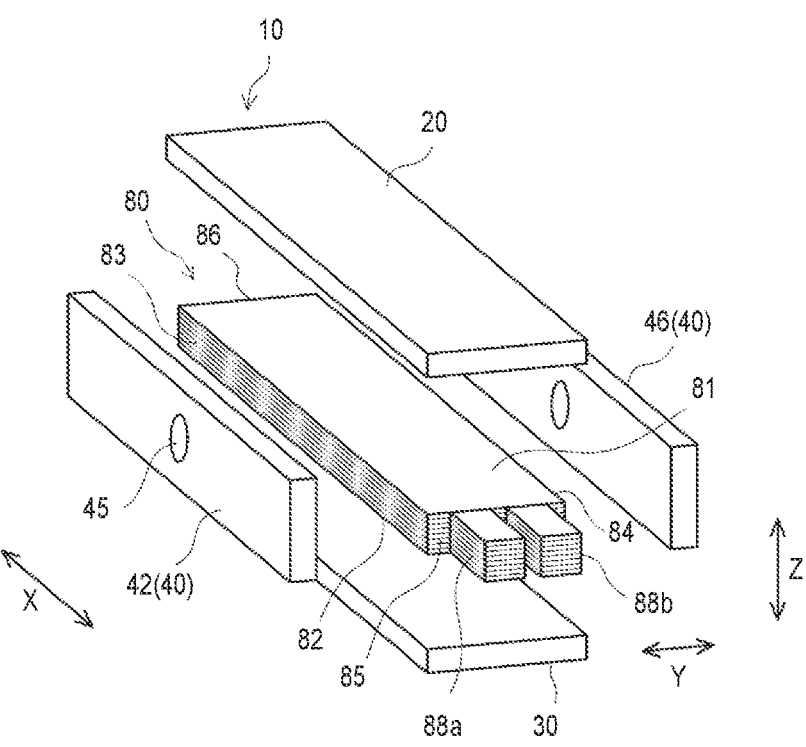
FIG. 3A is a perspective view schematically describing a configuration of a resin filling mold according to the first embodiment.
Figure 3B:
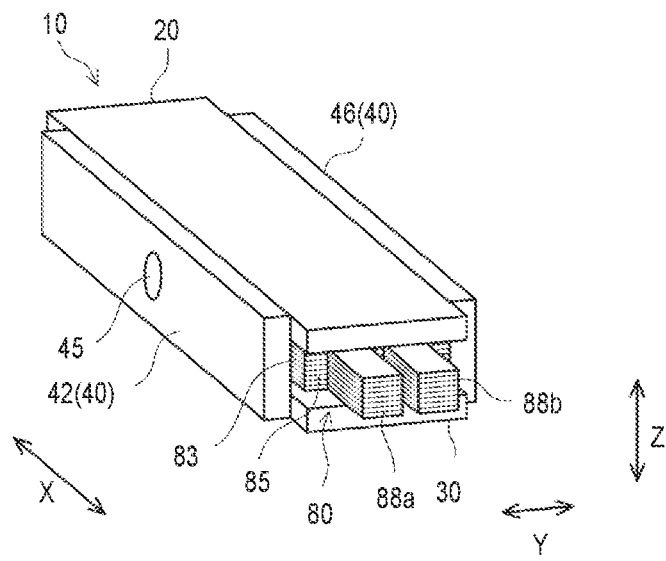
FIG. 3B is a perspective view schematically describing a configuration of the resin filling mold in a state where the laminated electrode body is housed therein according to the first embodiment.

The resin filling mold 10 has an internal space, houses an electrode body therein, and is configured to be capable of supplying a photo-curing resin material used for forming a resin layer to the electrode body. As illustrated in FIGS. 3A and 3B, the resin filling mold 10 roughly includes an upper mold 20, a lower mold 30, and a side surface mold 40 (a first side surface mold 42 and a second side surface mold 46). These form the internal space that houses the electrode body 80. In the description of the present embodiment hereinbelow, in the side surface mold, when the first side surface mold is not particularly distinguished from the second side surface mold, it may be simply referred to as a "side surface mold". When the electrode body 80 is housed in the internal space of the resin filling mold 10, the upper mold 20 and the lower mold 30 face the upper surface 81 and the lower surface 82 of the electrode body 80, respectively. The first side surface mold 42 and the second side surface mold 46 face the first side surface 83 and the second side surface 84 of the electrode body 80, respectively. The first side surface mold 42 and the second side surface mold 46 illustrated in the drawings are respectively composed of long side facing portions that face the side surfaces (that is, the first side surface 83 and the second side surface 84) on the long sides of the electrode body 80.

The resin filling mold 10 includes the upper mold 20, the lower mold 30, the first side surface mold 42, and the second side surface mold 46 as independent portions. With such a configuration, a distance between the upper mold 20 and the lower mold 30 can be adjusted according to the thickness in the laminating direction Z of the electrode body 80. Further, when the electrode body 80 is housed in the internal space of the resin filling mold 10, both ends in the long side direction X of the wide surfaces of the electrode body 80 can be opened. As such, when the resin material is filled, the air in the internal space of the resin filling mold 10 is released such that the fluidity of the resin material can be improved.

As for materials composing the resin filling mold 10, materials of the upper mold 20 and the lower mold 30 are not particularly limited as long as the materials do not interfere with their functions, and may be made of, for example, wood, metal, resin, glass, and ceramics. On the other hand, the side surface mold 40 includes a portion formed to be capable of transmitting light which can photo-cure the photo-curing resin material, and the material composing the portion transmits light used for curing the photo-curing resin material. From the viewpoint of photo-curing of the resin material, the entire side surface mold 40 may be made of a light-transmittable material. Examples of the material capable of transmitting such light (for example, ultraviolet rays) include acrylic resin, polycarbonate, polyolefin, and glass. Alternatively, for example, when light is ultraviolet rays, in the side surface mold 40, only the vicinity of the both ends in the long side direction X of the wide surfaces of the electrode body 80 is made of a material capable of transmitting ultraviolet rays, and portions other than such a portion may be made of a material that is opaque to ultraviolet rays and capable of transmitting visible light.

As illustrated in FIG. 3A, the first side surface mold 42 and the second side surface mold 46 are respectively provided with resin injection holes 45 used for injecting the photo-curing resin material from the resin material supplying device 4 to the internal space of the resin filling mold 10. The resin injection hole 45 is connected to the resin material supplying device 4 illustrated in FIG. 5A below. As such, the resin material can be supplied to at least the side surfaces 83, 84 on the long sides of the electrode body 80 housed in the internal space, and the resin layer can be formed on the side surfaces. The number, shape, size, and the like of the resin injection holes 45 are not particularly limited as long as the photo-curing resin material can be stably supplied from the resin material supplying device 4.

Figure 4:
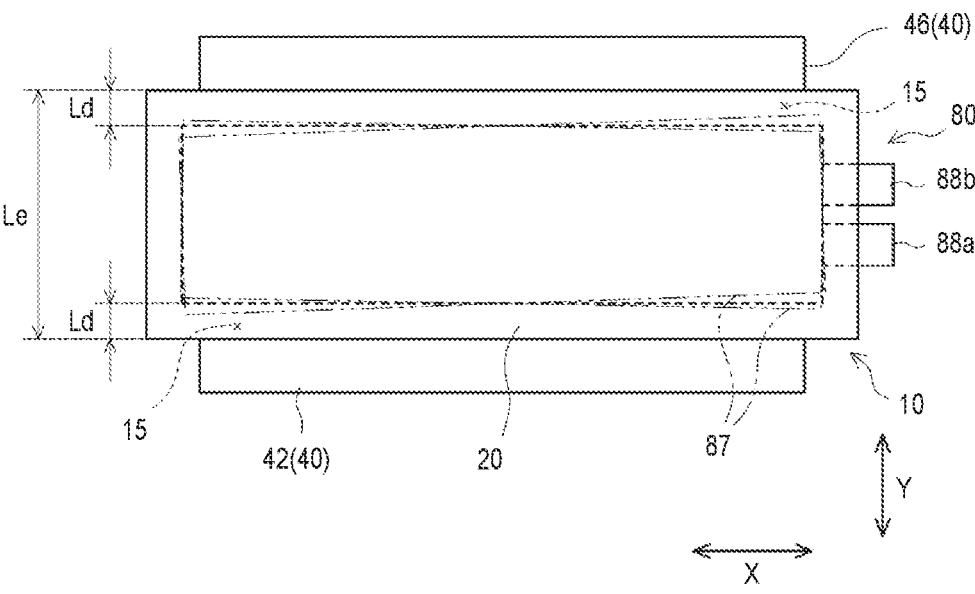
FIG. 4 is a plan view schematically describing the configuration of the resin filling mold in the state where the laminated electrode body is housed therein according to the first embodiment.

The electrode body 80 is sandwiched between the lower mold 30 and the upper mold 20 in the vertical direction, and is sandwiched between the two side surface molds 40 in the horizontal direction. As illustrated in FIG. 4, both ends of gaps 15 are open, and the resin material (not shown) at the ends is cured and sealed first, such that the resin material flows smoothly.

Further, gaps 15 are formed between the two side surfaces on the long sides of the electrode body 80 and the first side surface mold 42 and the second side surface mold 46, respectively. A width Ld of the gap 15 in the short side direction Y of the wide surface of the electrode body can be appropriately set according to a portion at which the side surface mold 40 is arranged.

When the positive and negative electrodes are laminated to manufacture the electrode body 80, lengths of the short sides of the electrode body 80 may vary depending on variations in the dimensions of the positive and negative electrodes and the lamination of the positive and negative electrodes (see electrodes represented by a reference sign 87 in FIG. 4). For this reason, widths Ld of the gaps 15 may vary depending on the individual electrode bodies 80 housed in the internal space of the resin filling mold 10. On the other hand, when the resin layer is formed using the manufacturing apparatus 1, a length Le of the short side of the upper mold 20 and the lower mold 30 is a fixed size, such that an occurrence of variation in the lengths of the short sides of the electrode body 80 including the resin layer is restricted. Even when the lengths of the short sides of the individual electrode bodies 80 vary, the width Ld of the gap 15 is set to such a width that an effect of forming the resin layer can be sufficiently obtained in any of the electrode bodies 80.

Figure 5A:
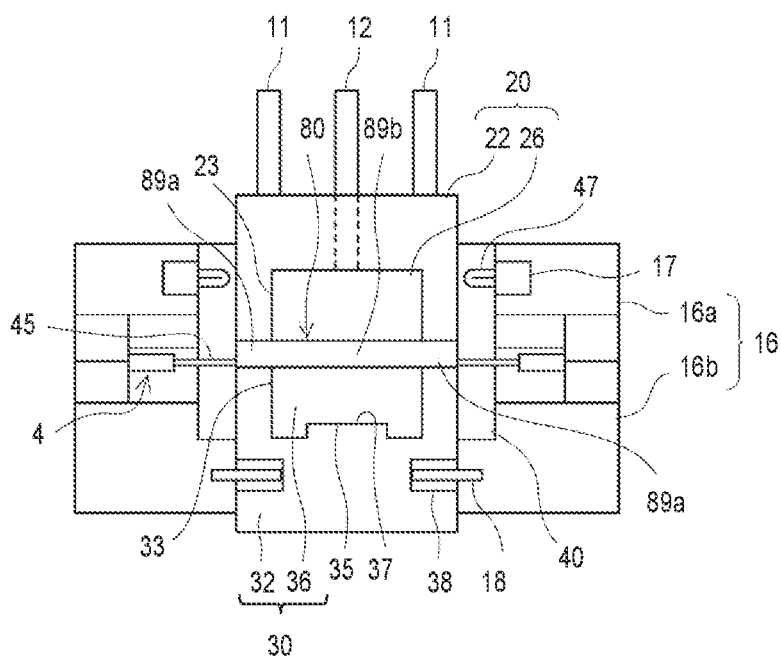
FIG. 5A is a cross-sectional view schematically describing main components of the manufacturing apparatus of the power storage device according to the first embodiment.

As illustrated in FIG. 5A, in the vertical direction, the electrode body 80 is sandwiched between the lower mold 30 and the upper mold 20 installed on a pedestal (not shown), and is pressed by restraining jigs 11 and a restraining jig 12. The restraining jigs 11 apply pressure to a portion of the wide surface of the electrode body 80 including the periphery portion. The restraining jig 12 applies pressure to a portion of the wide surface including a central portion. These two types of restraining jigs can apply different pressure amounts to the wide surface of the electrode body 80. The pressure applied by the restraining jigs 11 may be relatively strong. When forming the resin layer, it is possible to prevent the supplied resin material from seeping between the positive and negative electrodes. On the other hand, the pressure applied by the restraining jig 12 may be relatively weak. The distance between the upper mold 20 and the lower mold 30 can be adjusted according to the thickness in the laminating direction of the electrode body 80. The restraining jigs 11 are not particularly limited, but may be bolts or the like. The restraining jig 12 is not particularly limited, but may be one in which a pressing force can be adjusted relatively easily, such as a clamp or the like.

The upper mold 20 and the lower mold 30 are configured such that different pressure amounts are applied to the wide surface of the electrode body 80 by the restraining jigs 11 and the restraining jig 12. As illustrated, the upper mold 20 includes an upper frame 22 and an upper plate 26. The upper frame 22 is a frame-shaped member in which a concave space 23 is formed. The upper plate 26 is arranged in the concave space 23. On the other hand, the lower mold 30 includes a lower frame 32 and a lower plate 36. The lower frame 32 is a frame-shaped member in which a concave space 33 is formed. The lower plate 36 is arranged in the concave space 33. Further, a convex unit 35 is formed in the lower frame 32 and the convex unit 35 is fitted in a concave unit 37 formed in the lower plate 36. In the electrode body 80, pressure is applied to a portion 89a sandwiched between the upper frame 22 and the lower frame 32 by the restraining jigs 11, and pressure is applied to a portion 89b sandwiched between the upper plate 26 and the lower plate 36 by the restraining jig 12. A width L1 (a length in the horizontal direction) of frame portions of the upper frame 22 and the lower frame 32 (see FIG. 5B) can be 5 mm to 20 mm. Further, a length L2 illustrated in FIG. 5B can be 0.05 mm to 5 mm (preferably 0.1 mm to 1.0 mm).

Figure 5B:
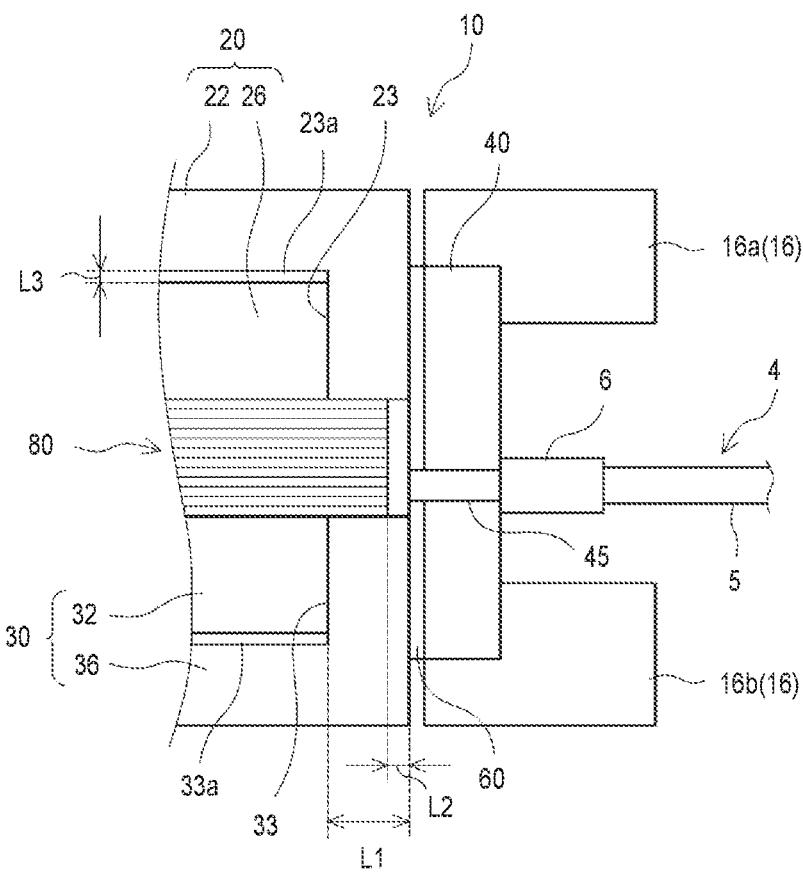
FIG. 5B is a cross-sectional view schematically illustrating main parts of the manufacturing apparatus of the power storage device illustrated in FIG. 5A.
Figure 5C:
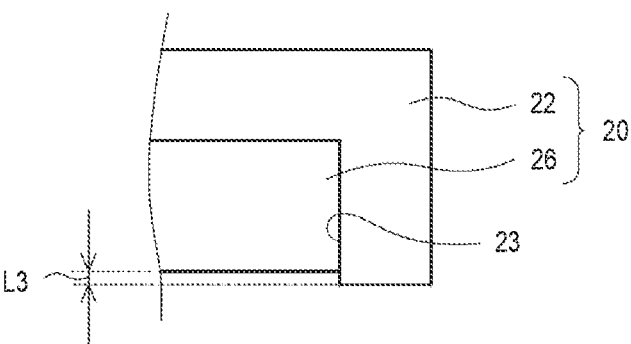
FIG. 5C is a cross-sectional view schematically describing an upper mold and an upper plate in the manufacturing apparatus of the power storage device illustrated in FIG. 5A.

Further, as illustrated in FIGS. 5B and 5C, a thickness of the upper plate 26 of the upper mold 20 is thinner than a height of the concave space 23 of the upper frame 22. For this reason, when the upper plate 26 is arranged in the concave space 23, the upper frame 22 protrudes from the upper plate 26 by a length L3 in the vertical direction. Further, the lower mold 30 is the same as the upper mold 20, and a thickness of the lower plate 36 is thinner than a height of the concave space 33 of the lower frame 32. For this reason, when the lower plate 36 is arranged in the concave space 33, the lower frame 32 protrudes from the lower plate 36 by the length L3 in the vertical direction. For this reason, when the electrode body 80 is arranged between the lower mold 30 and the upper mold 20, a gap 33a is formed between the lower frame 32 and the lower plate 36, and a gap 23a is formed between the upper frame 22 and the upper plate 26, respectively (see FIG. 5B). The length L3 can be approximately 0.05 mm to 0.5 mm (for example, approximately 0.1 mm to 0.2 mm).

As illustrated in FIGS. 5A and 5B, the resin filling mold 10 includes a mounting member 16 used for mounting the side surface mold 40 on the upper mold 20 and the lower mold 30. The mounting member 16 includes an upper mounting member 16a used for mounting the side surface mold 40 on the upper mold 20 and a lower mounting member 16b used for mounting the side surface mold 40 on the lower mold 30. The upper mounting member 16a includes a mounting bolt 17. The lower mounting member 16b includes a mounting protrusion 18. The side surface mold 40 is arranged in a predetermined position by fitting the mounting bolt 17 into a mounting hole 47 provided in the side surface mold 40 and inserting the mounting protrusion 18 into a mounting hole 38 provided in the lower mold 30 (the lower frame 32).

The resin material supplying device 4 is connected to the resin injection hole 45 of the side surface mold 40. Here, as illustrated in FIG. 5B, the resin material supplying device 4 is configured to be capable of supplying the photo-curing resin material to the internal space of the resin filling mold 10. The configuration of the resin material supplying device 4 is not particularly limited as long as it can exert its function, but it includes at least a supplying source that retains the resin material, and a pump and a pipe 5 used for supplying the resin material from the supplying source to the resin filling mold 10. The resin material supplying device 4 can supply the photo-curing resin material from the resin material supplying source to the internal space of the resin filling mold 10 through the pipe 5. The pipe 5 is configured to prevent light from being radiated to the resin material passing therethrough. For example, a light-shielding body is arranged around the pipe 5. The resin material supplying source can be, for example, a tank that retains the resin material therein. A discharging port of the pipe 5 may be provided with, for example, a nozzle (such as a commercially available dispenser nozzle) as an injection part 6. The photo-curing resin material supplied from the resin material supplying device 4 is not particularly limited as long as it is a resin material that can be cured with light having an appropriate viscosity (for example, 500 mPa·s to 50,000 mPa·s, and preferably 1,000 mPa·s to 20,000 mPa·s) used for implementing the flow when the resin material is supplied from the resin material supplying device 4 to the resin filling mold 10, and having a predetermined wavelength. Examples of such a resin material include a photo-curing acrylic resin. Further, a colorant may be added to the resin material, as necessary.

Figure 6A:
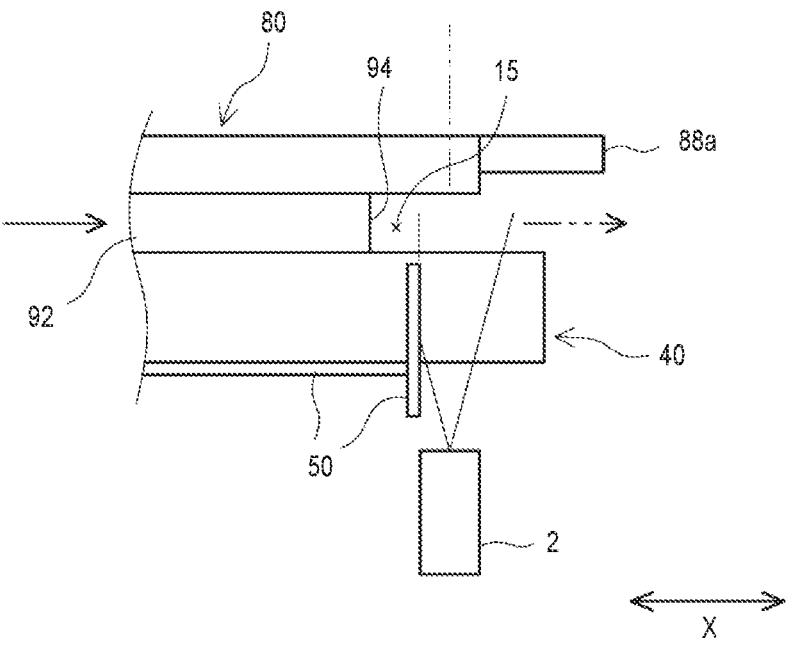
FIG. 6A is a description diagram schematically illustrating an arrangement situation of a side surface mold and a light radiation device, and a flow of a resin material in the manufacturing apparatus of the power storage device according to the first embodiment.
Figure 6B:
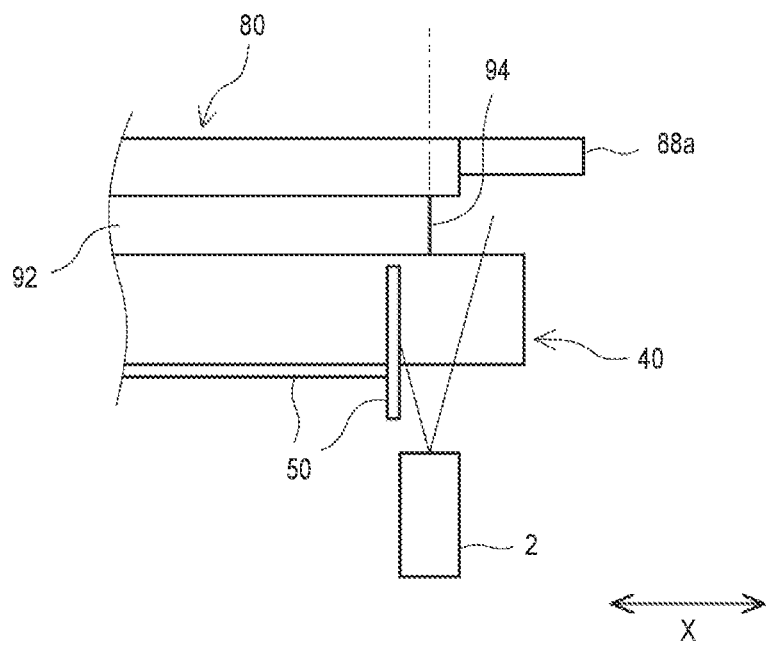
FIG. 6B is a description diagram schematically illustrating the arrangement situation of the side surface mold and the light radiation device, and the flow and curing of the resin material in the manufacturing apparatus of the power storage device according to the first embodiment.

The light radiation device 2 is a light source that radiates light which photo-cures the resin material supplied to the internal space of the resin filling mold 10. As illustrated in FIGS. 6A and 6B, the light radiation device 2 is arranged at a position at which the light radiation device 2 can radiate the light to the front part 94 of the resin material 92 supplied to the internal space (the gap 15) of the resin filling mold 10 that flows in the direction of arrows along the side surface of the electrode body 80 and cure the resin material 92 when the flowing front part 94 reaches a predetermined position (represented by a double dot-dashed line in the drawing) of the side surface. By such light radiation, the flowing front part 94 of the resin material 92 is stopped from flowing along the side surface of the electrode body 80. The light radiation device 2 may be arranged in the vicinities of the both ends in the long side direction X of the two side surfaces of the electrode body 80 housed in the resin filling mold 10, and configured to be capable of radiating light to each of such parts. The light radiation device 2 is not particularly limited and can be various light radiation devices, such as a 365 nm LED, a 385 nm LED, a 405 nm LED, a high-pressure mercury lamp, and a mercury xenon lamp, which can radiate light capable of curing the photo-curing resin material. The light radiated by the light radiation device 2 can be appropriately set according to the type of used photo-curing resin material and can be, for example, ultraviolet rays or visible light having a short wavelength.

As illustrated, the manufacturing apparatus 1 includes a light-shielding body 50. The light-shielding body 50 is arranged at a portion in a vicinity of a predetermined position in the first side surface mold 42 and the second side surface mold 46. As such, it is possible to prevent the light radiated from the light radiation device 2 from scattering in a direction deviating from the predetermined position. The light-shielding body 50 is not arranged in the vicinities of the both ends of the first side surface mold 42 and the second side surface mold 46 in the long side direction X of the wide surface of the electrode body 80. As such, it is possible to radiate the light to the flowing front part 94 of the resin material 92 at the predetermined position. As the light-shielding body 50, a well-known light-shielding body that does not transmit the light radiated from the light radiation device 2 can be used, and, for example, a light shielding tape or a light shielding plate containing a black resin material, and a light shielding metal foil (such as an aluminum foil) can be used.

The method of manufacturing a power storage device using the manufacturing apparatus disclosed herein roughly includes preparing a laminated electrode body and forming a resin layer on the laminated electrode body. First, a laminated body of positive and negative electrodes and solid electrolyte layers is manufactured. For manufacturing such a laminated body, a well-known method may be used as a method for manufacturing this type of laminated electrode body made of the above-described material, but the method does not characterize the present disclosure, and thus detailed description thereof will be omitted. The number of electrodes laminated in the laminated body is not particularly limited.

Next, the electrode body 80 is housed in the resin filling mold 10. As illustrated in FIG. 5A, 1, 2, 3, or more laminated bodies of positive and negative electrodes (including solid electrolyte layers) are laminated on the lower plate 36 to form the electrode body 80, and the upper plate 26 is overlapped from the vertical direction. Next, the lower plate 36, the electrode body 80, and the upper plate 26 are pressed in the vertical direction using the restraining jig 12 (such as a clamp). Although not particularly limited, during such lamination and pressing, an auxiliary member may be used to improve workability.

Next, the lower plate 36 and the upper plate 26 are respectively mounted on the lower frame 32 and the upper frame 22. Specifically, the lower plate 36 is arranged on the concave space 33 of the lower frame 32, the upper plate 26 is arranged in the concave space 23 of the upper frame 22, and these are pressed by the restraining jigs 11 (such as bolts) in the vertical direction. At this time, the amount of the pressing force is not particularly limited because it varies depending on the thickness in the laminating direction of the electrode body 80, but is an amount of a pressing force that can minimize the distance between the positive and negative electrodes without damaging the electrode body 80.

Next, the side surface mold 40 is mounted. The first side surface mold 42 and the second side surface mold 46 are respectively arranged on the first side surface 83 and the second side surface 84 of the electrode body 80. Next, the mounting protrusion 18 is inserted into the mounting hole 38 to mount the lower mounting member 16b, the mounting bolt 17 is fitted into the mounting hole 47 to mount the upper mounting member 16a, and the side surface mold 40 is fixed from the horizontal direction. Here, as illustrated in FIG. 5B, between the electrode body 80 and the side surface mold 40, between the upper mold 20 (the upper frame 22) and the side surface mold 40, and between the lower mold 30 (the lower frame 32) and the side surface mold 40, the resin sheet 60 may be arranged. As a method of arrangement, the resin sheet 60 may be attached to the side surface mold 40 with a sticker or an adhesive, and these may be integrated. By arranging the resin sheet 60, the side surface mold 40 can be more easily removed. The resin sheet 60 transmits the light which cures the photo-curing resin material and may have a low adhesive force (excellent in mold releasability) with the photo-curing resin material after curing. For example, it can be made of silicone, a fluororesin, such as polytetrafluoro-ethylene, and a polyolefin, such as polypropylene or poly-ethylene. Further, when the resin sheet 60 is a flexible material, such as a silicone resin, a sealing property between the side surface mold 40, and the upper frame 22 and the lower frame 32 can be improved, and leakage of the resin material 92 can be restricted.

To improve the mold releasability, a mold release oil, such as silicone oil, may be applied to a surface of the resin sheet 60 (the side surface mold 40 when the resin sheet 60 does not exist). When the resin sheet 60 is used, it is not always necessary to use the mold release oil. When the resin sheet 60 does not exist, the mold release oil may be applied to the surface of the side surface mold 40.

The formation of the resin layer 90 roughly includes the supply of the resin material 92 to the resin filling mold 10 and the radiation of light to the resin material 92. Before the formation of the resin layer 90, the light radiation device 2 and the light-shielding body 50 are arranged at predetermined positions. When the resin material 92 is supplied to the resin filling mold 10, the injection part 6 of the resin material supplying device 4 is inserted into the resin injection hole 45 formed in the side surface mold 40. The light radiation device 2 and the light-shielding body 50 are arranged at positions described above. Next, a switch of the entire manufacturing apparatus 1 is turned on such that an operation control of the manufacturing apparatus 1 by the control unit 8 is possible. When the control unit 8 turns on a switch of the resin material supplying device 4, the photo-curing resin material is supplied from the resin mate-rial supplying source through the pipe 5 and from the injection part 6 to the internal space (the gap 15) of the resin filling mold 10. The supply amount and supply speed of the resin material 92 are not particularly limited, and can be appropriately designed according to the size and the like of the electrode body forming the resin layer.

The resin material 92 supplied to the internal space (the gap 15) of the resin filling mold 10 through the resin injection hole 45 flows toward the both ends of the side surface along the side surface on the long side of the electrode body 80 (see FIG. 6A). When a predetermined amount of the resin material 92 is supplied, the control unit 8 turns off the switch of the resin material supplying device 4 to stop the supply of the resin material 92. On the other hand, the control unit 8 turns on a switch of the light radiation device 2 to cure the flowing front part 94 by radiating the light to the flowing front part 94 (see FIG. 6B). In this manner, it is possible to stop the flowing front part 94 from flowing along the side surface of the electrode body 80. Then, the light radiation device that executes the light radiation is switched from the light radiation device 2, used when the flowing front part 94 is cured, to another light radiation device, different from the light radiation device 2, and the light radiation to the resin material 92 is continued to form a resin layer. As such another light radiation device, a light radiation device capable of radiating a wide range of light can be used. Further, when the light radiation device 2 is an ultraviolet radiation device, such as a 365 nm LED, and portions except for the vicinities of both ends of the side surface mold 40 are made of a material which is opaque to ultraviolet rays and capable of transmitting visible light, a visible light radiation device, such as a 405 nm LED, may be used as another light radiation device.

Alternatively, the timing at which the control unit 8 stops the supply of the resin material 92 may be a time at which it senses that the flowing front part 94 of the resin material 92 has reached a predetermined portion of the side surface on the long side of the electrode body 80. When the sensor is arranged in the vicinity of the predetermined portion, the sensor can sense the fact that the flowing front part 94 has reached the predetermined portion. Here, a colored resin material may be used as the resin material 92. In such a manner, the work efficiency can be improved. However, even when the flowing front part 94 has reached a predetermined portion but the supply of the resin material 92 used for forming the resin layer is insufficient, the supply is continued while appropriately adjusting the supply speed such that leakage of the resin material 92 does not occur. When the supply amount reaches a sufficient amount, the switch of the resin material supplying device 4 is turned off.

After the resin layer 90 is formed, the electrode body 80 is removed from the resin filling mold 10, housed in an exterior body (such as a laminated film exterior body or a square battery case) and sealed, and a power storage device (here, an all-solid-state lithium-ion secondary battery) in a usable state can be manufactured by executing activation and aging treatments under predetermined conditions.

Figure 7:
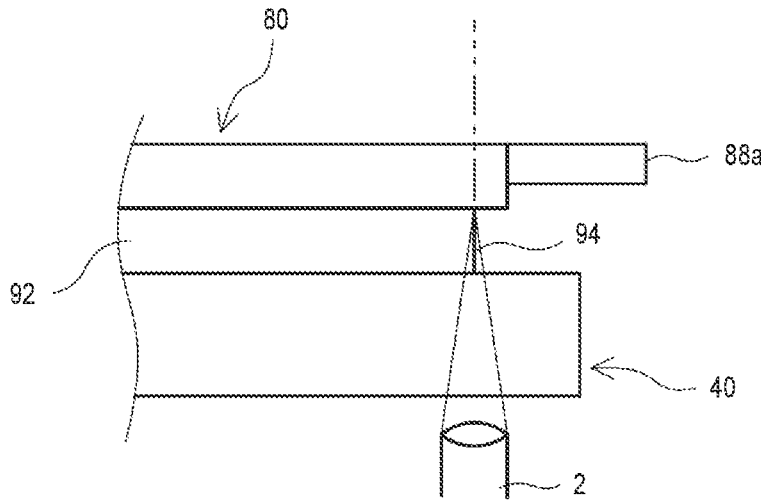
FIG. 7 is a description diagram illustrating another example of the light radiation device provided in the manufacturing apparatus of the power storage device.
Figure 8:
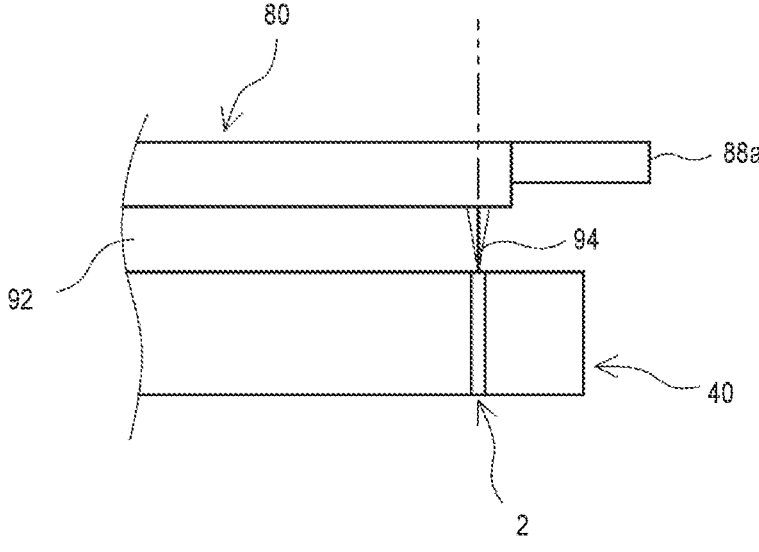
FIG. 8 is a description diagram illustrating still another example of the light radiation device provided in the manufacturing apparatus of the power storage device.

As described above, one embodiment of the manufacturing apparatus of the power storage device and the manufacturing method of the power storage device using the manufacturing apparatus disclosed herein has been described as the first embodiment with reference to each drawing. However, such a first embodiment can include, for example, the following modified examples. In the above embodiment, the light-shielding body is provided, but the present disclosure is not limited thereto as long as the light can be restricted from scattering in a direction deviating from a desired position. For example, when a light radiation device 2 capable of radiating a beam that converges light which photo-cures the resin material 92 to one point (see FIG. 7) or a light radiation device 2 embedded inside the side surface mold 40 is used (see FIG. 8), it is not always necessary to attach the light-shielding body.

In the above embodiment, when the entire supplied resin material is cured to form the resin layer, another light radiation device, different from the light radiation device that cures the flowing front part of the resin material, is used, but the present disclosure is not limited thereto. For example, by removing the light-shielding body and continuing the light radiation of the resin material after radiating the light to the flowing front part of the resin material, the entire supplied resin material can be cured to form the resin layer.

In the above embodiment, the supply or the light radiation of the resin material is automatically executed by the control unit, but the present disclosure is not limited thereto. The supply or the light radiation of the resin material can be manually executed by an operator. For example, the operator can use a syringe that retains the resin material as the resin material supplying device and a light source (such as an ultraviolet LED) capable of radiating a predetermined light (such as ultraviolet rays) as a light radiation device. To describe with reference to FIGS. 5B, 6A, and 6B, the operator inserts a tip of the syringe into the resin injection hole 45 as the injection part 6, pushes a plunger, and injects the resin material into the internal space of the resin filling mold 10. In such a manner, the resin material 92 flows toward the both ends in the same direction along the side surface on the long side of the electrode body 80. Next, upon visually checking that the flowing front part 94 of the supplied resin material 92 has reached a predetermined portion, the operator stops the supply of the resin material 92, turns on a switch of the light source (for example, an ultraviolet LED), and radiates the light (for example, ultraviolet rays) radiated from the light source (for example, an ultraviolet LED) to the flowing front part 94. Further, the operator removes the light-shielding body 50 and radiates light (for example, ultraviolet rays) to the entire supplied resin material 92. As such, the resin layer 90 can be formed.

Second Embodiment

Figure 9A:
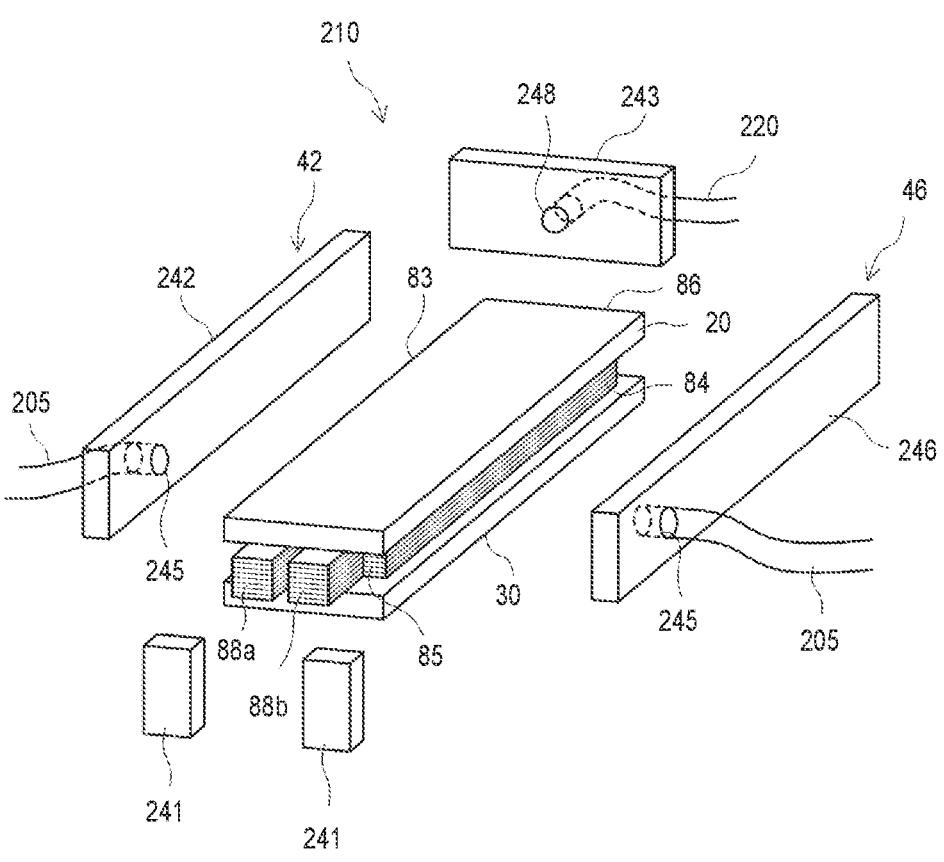
FIG. 9A is a perspective view schematically describing a configuration of a resin filling mold according to a second embodiment.
Figure 9B:
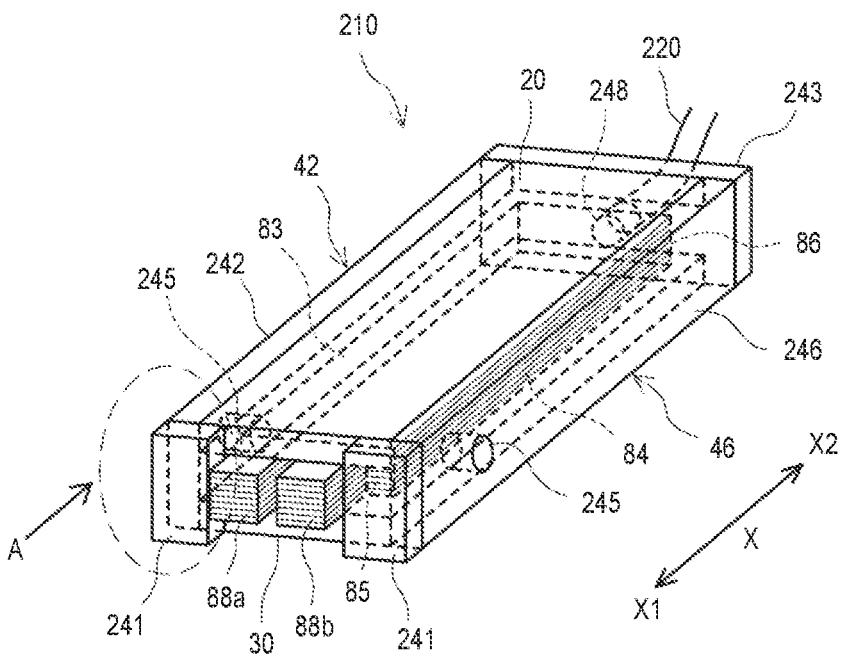
FIG. 9B is a perspective view schematically describing a configuration of the resin filling mold in a state where the laminated electrode body is housed therein according to the second embodiment.

In the second embodiment, as illustrated in FIGS. 9A and 9B, the first side surface mold 42 and the second side surface mold 46 of a resin filling mold 210 are respectively provided with long side facing portions 242, 246 that respectively face the side surfaces 83, 84 on the long side of the electrode body 80. Further, at least one of the first side surface mold 42 and the second side surface mold 46 is provided with short side facing portions 241, 243 adjacent to the side surfaces 83, 84 and facing the side surfaces 85, 86 on the short side of the electrode body 80. The short side facing portions 241 are arranged to be respectively adjacent to the long side facing portion 242 and the positive electrode current collecting terminal 88a, and the long side facing portion 246 and the negative electrode current collecting terminal 88b. The short side facing portion 243 is arranged to face the side surface 86 of the electrode body 80.

Resin injection holes 245 are respectively provided in the long side facing portions 242, 246. The resin injection holes 245 are respectively provided in the vicinity of the end on the side of the short side facing portions 241 from among the ends on the long sides of the long side facing portions 242, 246. Each of the resin injection holes 245 is connected to a pipe 205 and the resin material supplying device 4 (see FIG. 2 and the like). The connection between the resin injection hole 245 and the resin material supplying device 4 is the same as the connection between the resin injection hole 45 and the resin material supplying device 4 (see FIG. 5B and the like) in the first embodiment, and thus the description thereof will be omitted. The pipe 205 is configured to prevent light from being radiated to the resin material passing therethrough. For example, a light-shielding body is arranged around the pipe 205.

The short side facing portion 243 is provided with a resin discharging unit 248. The resin discharging unit 248 is provided to discharge the resin material supplied to the internal space of the resin filling mold 210 to the outside. In FIGS. 9A and 9B, the resin discharging unit 248 is a through-hole and is connected to a pipe 220. The resin material is discharged from the inside of the resin filling mold 210 to the outside through the resin discharging unit 248 and the pipe 220. The pipe 220 is configured to prevent light from being radiated to the resin material passing therethrough. For example, a light-shielding body is arranged around the pipe 220. By providing the resin discharging unit 248, an excess amount of the supplied resin material can be discharged to the outside. For this reason, in the resin filling mold 210, it is possible to restrict the internal pressure therein from increasing due to a delay in stopping the supply of the resin material. Further, it is possible to reduce the number of sensors and light radiation devices installed to stop the flow of the resin material. The number of sensors installed to stop the flow of the resin material can be zero.

In the present embodiment, the light radiation device (not shown) is arranged to be capable of radiating light (for example, ultraviolet rays) to the front part of the resin material that flows along the side surface 85 of the electrode body 80 facing the short side facing portion 241. For this reason, in the short side facing portion 241, the portion in the vicinity of the position to which light is radiated is formed to transmit the light. For example, the short side facing portion 241 may be made of a material capable of transmitting light (such as ultraviolet rays). As such a material, the same material as that described in the first embodiment can be used.

Figure 10:
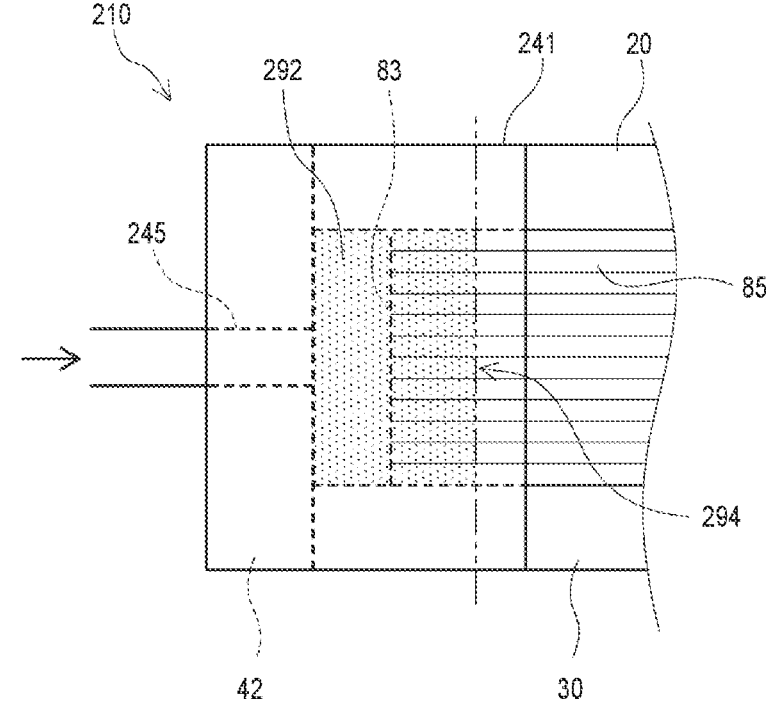
FIG. 10 is a view along an arrow A in a frame in FIG. 9B.

As illustrated in FIG. 10, when a front part 294 of a resin material 292 that flows along the side surface 85 has reached a predetermined position on the side surface (represented by a double dot-dashed line in the drawing), the light radiation device is arranged at a portion at which it can cure the resin material 292 by radiating light to the flowing front part 294. The light radiation device radiates the light to the flowing front part 294 before the flowing front part 294 reaches the positive electrode current collecting terminal 88a (see FIG. 9B). The same applies to the negative electrode current collecting terminal 88b (see FIG. 9B). From the viewpoint of accurately stopping the flow of the resin material 292 at a desired portion, a line lens may be arranged at the portion at which the light radiation device is arranged to collect the radiated light (such as ultraviolet rays) and radiate the light to the flowing front part 294. The light radiation device itself is the same as the light radiation device 2 in the first embodiment, and thus the description thereof will be omitted.

In the manufacturing method of the power storage device in the present embodiment (see FIGS. 2, 9A, 9B, 10, and 11), first, the electrode body 80 is prepared, sandwiched between the upper mold 20 and the lower mold 30 in the vertical direction, and restrained in the same direction. The materials and procedures used at this time are the same as those in the first embodiment, and thus the description thereof will be omitted. Next, the side surface mold is mounted. The same procedures as those described as the arrangement of the first side surface mold 42 and the second side surface mold 46 in the first embodiment are applied to the arrangement of the long side facing portions 242, 246, and thus the description thereof will be omitted. The short side facing portions 241, 243 can be arranged by mounting them on the upper mold 20, the lower mold 30, and the side surface mold 42(46) using mounting parts, such as bolts. However, the mounting parts are not always necessary. For example, in a production line, a set of the upper mold 20, the lower mold 30, and the laminated electrode body 80 is sent from a position facing the side surface mold 42(46) (initially, arranged being separated from both ends of the conveyor) by a conveyor and the like, and stopped. Next, the side surface mold 42(46) is moved by an arm and the like and pressed against the upper mold 20 and the lower mold 30. Similarly, the short side facing portions 241, 243 are also pressed by another arm (for example, by moving in an arc from the side direction of the conveyor) to the positions illustrated in FIG. 9B. In such cases, no mounting parts are needed.

Next, a resin layer 290 is formed on the electrode body 80. Before the formation of the resin layer 290, the light radiation device 2 is arranged at a predetermined position. When the resin material 292 is supplied to the resin filling mold 210, an injection part of the resin material supplying device 4 is inserted into the resin injection holes 245 formed in the long side facing portions 242, 246. The light radiation device 2 is arranged at a portion described above. Next, the switch of the entire manufacturing apparatus 1 is turned on such that the operation control of the manufacturing apparatus 1 by the control unit 8 is possible. When the control unit 8 turns on the switch of the resin material supplying device 4, the photo-curing resin material 292 is supplied from the resin material supplying source through the pipe 205 and from the injection part to the internal space of the resin filling mold 210. A supplying amount and supplying speed of the resin material 292 are not particularly limited, and can be appropriately designed according to the size and the like of the electrode body 80 forming the resin layer 290. As necessary, a light-shielding body may be arranged to restrict the light from scattering from the predetermined position.

The resin material 292 supplied to the internal space of the resin filling mold 210 through the resin injection hole 245 flows in the directions toward the side surfaces 85, 86 respectively along the side surfaces 83, 84 on the long side of the electrode body 80 (an X1 direction and an X2 direction in FIG. 9B). The resin material 292 that flows in the X1 direction flows along the side surface 85 through boundaries between the side surfaces 83, 84 and the side surface 85. When the front part 294 of the resin material 292 reaches a predetermined position (the portion represented by a double dot-dashed line in FIG. 10), the flowing front part 294 is cured by the light of the light radiation device 2. After the resin material 292 is filled, the resin material 292 is cured by radiating the light through the light-transmittable side surface mold to form a solid resin layer 290 on the side surface of the electrode body 80. The light of the light radiation device 2 may be continuously radiated such that the resin material 292 is cured when the flowing front part 294 of the resin material 292 has reached a predetermined position. In such a case, an installation of a sensor that detects the fact that the flowing front part 294 has reached can be omitted. Further, the switching of the light radiation devices 2 can be omitted. As necessary, a sensor may be installed as appropriate, and the light radiation devices 2 may be set to be switched.

On the other hand, when the flow of the resin material 292 is stopped on the side surface 85 as described above, the resin material 292 flows only in the X2 direction on the side surfaces 83, 84. The resin material 292 flows along the side surface 86 through the boundaries between the side surfaces 83, 84 and the side surface 86. Then, the resin material 292 reaches the resin discharging unit 248, and is discharged to the outside of the resin filling mold 210 through the resin discharging unit 248. After the resin discharging unit 248 starts discharging the resin material 292 as described above, the control unit 8 stops the supply of the resin material 292. For example, using a fixed amount pump, the control unit 8 may set the supplying amount of the resin material 292 to be greater than an amount required for forming the resin layer 290 and stop the supply of the resin material 292 at a timing at which the resin material 292 of such an amount is supplied. In this case, it is not necessary to install a sensor used to stop the supply of the resin material 292. Further, since the resin discharging unit 248 is provided, it is possible to restrict the internal pressure of the resin filling mold 210 from increasing and prevent the resin material 292 from leaking from the gap of the mold to the outside. Alternatively, the time after a predetermined time period has elapsed from the start of the flow of the resin amount into the pipe 220 can be set as the timing at which the control unit 8 stops the supply of the resin material 292. In this case, the pipe 220 may be provided with a sensor (for example, a weight sensor) capable of detecting a passage of the resin material 292. Thereafter, the resin is cured by radiating the light to the entire resin. Next, the side surface molds (the short side facing portion and the long side facing portion) are removed and the upper mold and the lower mold are removed.

Figure 11:
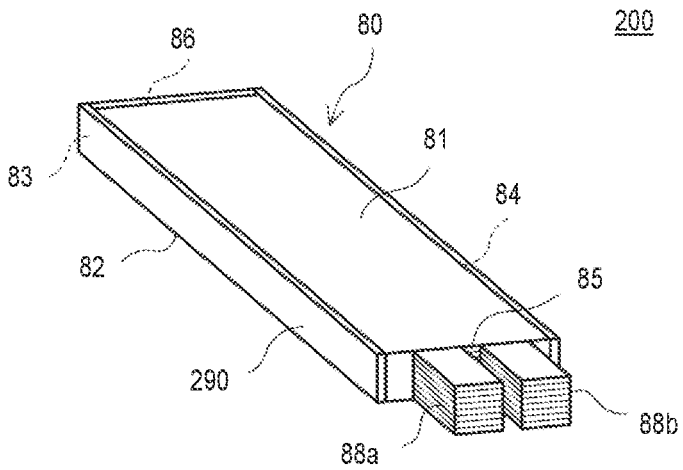
FIG. 11 is a perspective view schematically illustrating an example of an all-solid-state battery that includes the laminated electrode body according to the second embodiment.

When the above manufacturing method is executed, the resin layer 290 is formed on the side surface of the electrode body 80 as illustrated in FIG. 11. The resin layer 290 is formed on the side surfaces 83, 84 on the long side and the side surfaces 85, 86 on the short side of the electrode body 80. By forming the resin layer 290, the edge (the periphery portion) of the electrode body 80 can be protected. Further, in an all-solid-state battery 200 including the electrode body 80, an expansion of an active material during charging/discharging (particularly an initial charging of a battery assembly) causes an occurrence of a displacement, a gap, or a crack in solid electrolyte layers or adjacent positive/negative electrode active material layers that may influence a battery performance. However, it is possible to restrict the occurrence, thereby restricting deterioration of the battery performance caused by the gaps or cracks. In FIG. 11, the exterior body is not shown.

Figure 12:
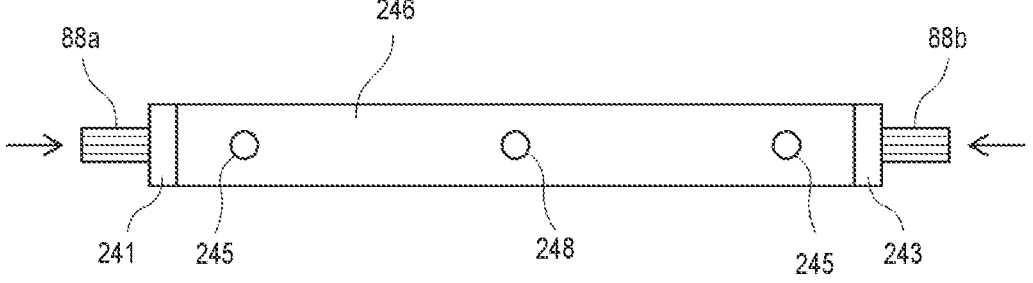
FIG. 12 is a side view schematically describing a part of a configuration of a resin filling mold according to a modified example of the second embodiment.

In the above embodiment, both the positive electrode current collecting terminal 88a and the negative electrode current collecting terminal 88b project outward from the side surface 85 on the short side of the electrode body 80, but the present disclosure is not particularly limited thereto. In other words, the positive electrode current collecting terminal 88a may be arranged to project outward from one side surface 85 on the short side of the electrode body 80, and the negative electrode current collecting terminal 88b may arranged to project outward from the other side surface 86, respectively. In this case, the configuration of the short side facing portion 241 facing the side surface 85 is the same as that of the short side facing portion 243 facing the side surface 86. In other words, both the short side facing portion 241 and the short side facing portion 243 are configured to be adjacent to the long side facing portion 242 and the current collecting terminal (the positive electrode current collecting terminal 88a or the negative electrode current collecting terminal 88b), and adjacent to the long side facing portion 246 and the current collecting terminal (the positive electrode current collecting terminal 88a or the negative electrode current collecting terminal 88b). The short side facing portion 241 is arranged to be adjacent to the long side facing portion 242 and the positive electrode current collecting terminal 88a, and adjacent to the long side facing portion 246 and the positive electrode current collecting terminal 88a, respectively. The short side facing portion 243 is arranged to be adjacent to the long side facing portion 242 and the negative electrode current collecting terminal 88b, and adjacent to the long side facing portion 246 and the negative electrode current collecting terminal 88b, respectively. In this case, as illustrated in FIG. 12, the resin discharging unit 248 is provided at a central portion of the long side facing portion 246. Further, resin injection holes 245 are provided at both ends of the long side facing portion 246. When the resin material 292 is supplied to the resin filling mold 210 through the resin injection holes 245, it flows along the side surface on the long side and the short side of the electrode body 80 (not shown). The resin material 292 that flows on the long side is discharged to the outside of the resin filling mold 210 through the resin discharging unit 248. The resin material 292 that flows on the short side of the electrode body 80 is cured by the light from the light radiation device 2 when the flowing front part 294 has reached a predetermined portion of the short side facing portions 241, 243. Arrows in FIG. 12 represent the direction in which the light from the light radiation device 2 is radiated. Although not shown, the same applies to the side of the long side facing portion 242.

What is claimed is:

1. A manufacturing apparatus of a power storage device that includes a laminated electrode body in which a plurality of rectangular positive electrodes and negative electrodes is laminated with separators between the positive and negative electrodes and a resin layer made of a cured material of a photo-curing resin formed on each of at least two side surfaces on long sides from among side surfaces of the laminated electrode body when two rectangular wide surfaces at both ends in a laminating direction of the laminated electrode body are defined as an upper surface and a lower surface, respectively, the manufacturing apparatus comprising:

a resin filling mold including an upper mold and a lower mold respectively facing the upper surface and the lower surface, and a first side surface mold and a second side surface mold respectively facing the two side surfaces on the long sides, the resin filling mold being configured to form an internal space that houses the laminated electrode body and to supply the photo-curing resin used for forming the resin layer on at least the side surfaces on the long sides of the laminated electrode body housed in the resin filling mold; and a light radiation device configured to radiate light which photo-cures the photo-curing resin supplied to the internal space of the resin filling mold, wherein the manufacturing apparatus comprises light radiation devices arranged at predetermined positions of the internal space to stop front parts of the photo-curing resin supplied to the internal space that flow along the side surfaces of the laminated electrode body by curing the front parts of the photo-curing resin that reach the predetermined positions of the side surfaces wherein the upper mold comprises an upper frame and an upper plate and the upper frame applies pressure to a peripheral portion of the upper surface of the laminated body and the upper plate applies pressure to a central portion of the upper surface laminated electrode body.

2. The manufacturing apparatus according to claim 1, wherein the light radiation device is configured to radiate the light to respective vicinities of both ends in a long side direction of the two side surfaces on the long sides of the laminated electrode body housed in the resin filling mold.

3. The manufacturing apparatus according to claim 1, wherein at least portions, in the first side surface mold and the second side surface mold, in vicinities of the predetermined positions are made of a material that transmits the light which photo-cures the photo-curing resin.

4. The manufacturing apparatus according to claim 3, further comprising:

a light-shielding body configured to restrict the light radiated from the light radiation device from scattering in a direction deviating from the predetermined positions, at least a part of the light-shielding body being attached to the portions overlapping with both ends in a long side direction of the first side surface mold and the second side surface mold in a top view.

5. The manufacturing apparatus according to claim 1, wherein the resin filling mold includes a short side facing portion that faces a side surface on a short side of the laminated electrode body.

6. The manufacturing apparatus according to claim 5, wherein:

the laminated electrode body includes a positive electrode current collecting terminal and a negative electrode current collecting terminal respectively connected to the positive electrode and the negative electrode of the laminated electrode body;

the positive electrode current collecting terminal and the negative electrode current collecting terminal are arranged to project outward from at least one side surface from among two side surfaces on short sides of the laminated electrode body; and the light radiation device is configured to radiate the light to the front part of the photo-curing resin that flows along at least one side surface from among the two side surfaces on the short sides.

7. The manufacturing apparatus according to claim 6, wherein:

the positive electrode current collecting terminal and the negative electrode current collecting terminal are arranged to project outward from the respective two side surfaces on the short sides of the laminated electrode body; and the light radiation device is configured to radiate the light to the front parts of the photo-curing resin that flow along the respective two side surfaces on the short sides.

8. The manufacturing apparatus according to claim 6, wherein, in the short side facing portion, a portion overlapping a position to which the light is radiated in a top view is made of a material that transmits the light which photo-cures the photo-curing resin.

9. The manufacturing apparatus according to claim 5, wherein the resin filling mold includes a resin material discharging unit that discharges the photo-curing resin supplied to the internal space of the resin filling mold to an outside.

10. The manufacturing apparatus according to claim 1, wherein the resin filling mold is configured with restraining jigs to adjust a distance between the upper mold and the lower mold according to a thickness in the laminating direction of the laminated electrode body.

11. A manufacturing method of a power storage device that includes a laminated electrode body in which a plurality of rectangular positive electrodes and negative electrodes is laminated with separators between the positive and negative electrodes and a resin layer made of a cured material of a photo-curing resin formed on each of at least two side surfaces on long sides from among side surfaces of the laminated electrode body when two rectangular wide surfaces at both ends of the laminated electrode body in a laminating direction are defined as an upper surface and a lower surface, respectively, the manufacturing method comprising:

preparing the laminated electrode body;

housing the laminated electrode body in an internal space formed by a resin filling mold, the resin filling mold including an upper mold and a lower mold respectively facing the upper surface and the lower surface, and a first side surface mold and a second side surface mold respectively facing the two side surfaces on the long sides;

applying pressure to a peripheral portion of the upper surface of the laminated electrode body with an upper frame of an upper mold, and applying pressure to a central portion of the upper surface of the laminated electrode body with an upper plate of the upper mold;

supplying, to the internal space of the resin filling mold, the photo-curing resin used for forming the resin layer on at least the two side surfaces on the long sides of the laminated electrode body housed in the resin filling mold; and curing, when front parts of the supplied photo-curing resin that flow along the side surfaces of the laminated electrode body reach predetermined positions, the front parts by radiating light to the front parts and stopping the front parts from flowing along the side surfaces with light radiating devices arranged at the predetermined positions.

12. The manufacturing method according to claim 11, wherein, when the light is radiated, the light is radiated to respective vicinities of both ends in a long side direction of the two side surfaces on the long sides of the laminated electrode body housed in the resin filling mold.

13. The manufacturing method according to claim 11, wherein at least portions, in the first side surface mold and the second side surface mold, in vicinities of the predetermined positions are made of a material that transmits the light which photo-cures the photo-curing resin.

14. The manufacturing method according to claim 13, wherein a light-shielding body that restricts the radiated light from scattering in a direction deviating from the predetermined positions, at least a part of the light-shielding body being attached to the portions overlapping with both ends in a long side direction of the first side surface mold and the second side surface mold in a top view.

15. The manufacturing method according to claim 11, wherein the resin filling mold includes a short side facing portion that faces a side surface on a short side of the laminated electrode body.

16. The manufacturing method according to claim 15, wherein:

the laminated electrode body includes a positive electrode current collecting terminal and a negative electrode current collecting terminal respectively connected to the positive electrode and the negative electrode of the laminated electrode body;

the positive electrode current collecting terminal and the negative electrode current collecting terminal are arranged to project outward from at least one side surface from among two side surfaces on short sides of the laminated electrode body; and the light is radiated to the front part of the photo-curing resin that flows along at least one side surface from among the two side surfaces on the short sides.

17. The manufacturing method according to claim 16, wherein:

the positive electrode current collecting terminal and the negative electrode current collecting terminal are arranged to project outward from the respective two side surfaces on the short sides of the laminated electrode body; and the light is radiated to the front parts of the photo-curing resin that flow along the respective two side surfaces on the short sides.

18. The manufacturing method according to claim 16, wherein, in the short side facing portion, a portion overlapping a position to which the light is radiated in a top view is made of a material that transmits the light which photo-cures the photo-curing resin.

19. The manufacturing method according to claim 15, wherein the resin filling mold includes a resin material discharging unit that discharges the photo-curing resin supplied to the internal space of the resin filling mold to an outside.

20. The manufacturing method according to claim 11, wherein the resin filling mold is configured with restraining jigs to adjust a distance between the upper mold and the lower mold according to a thickness in the laminating direction of the laminated electrode body.

\* \* \* \* \*